United States Patent Office 2,905,193
Patented Sept. 22, 1959

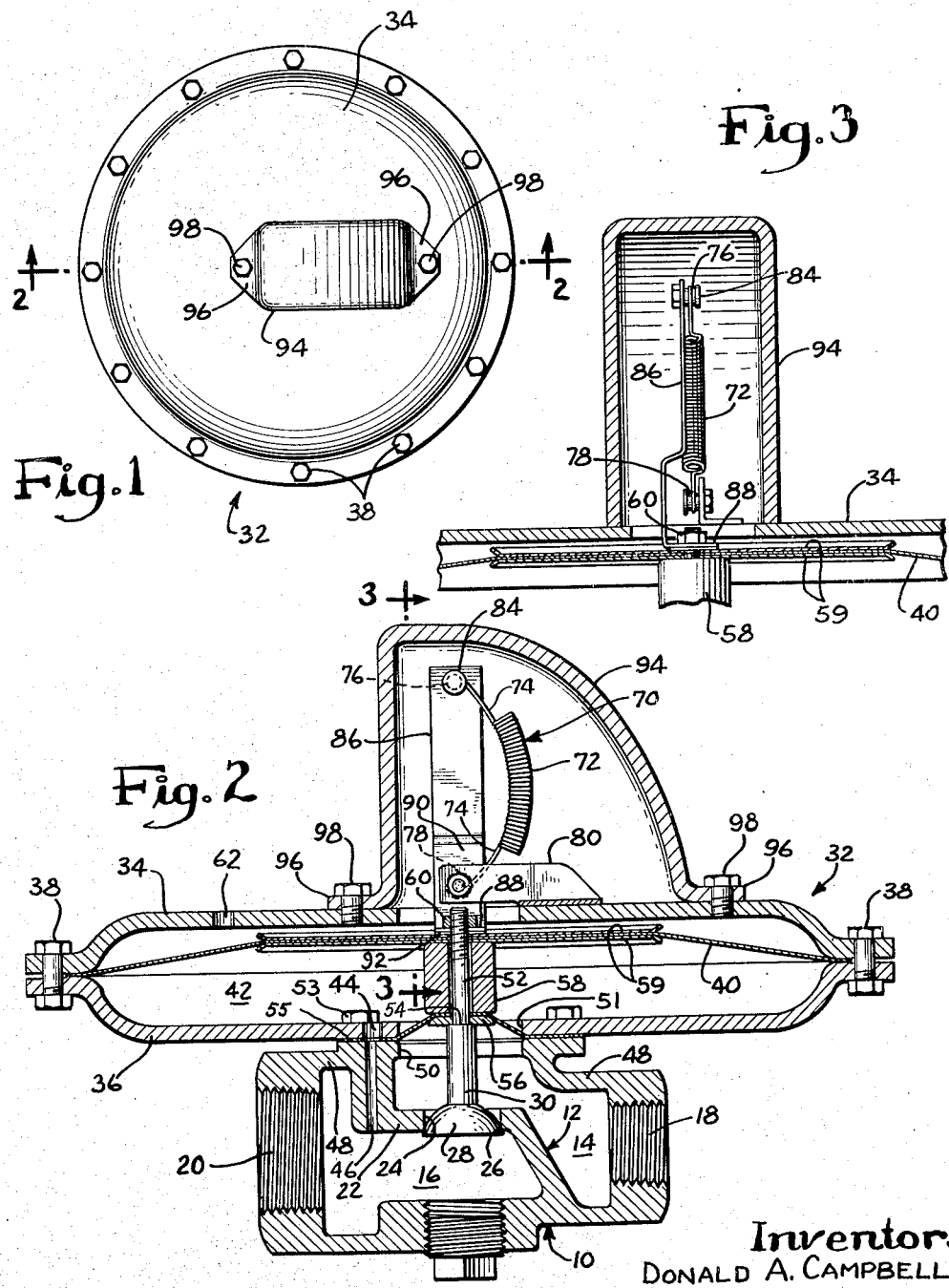

2,905,193

PRESSURE REGULATING VALVE CONSTRUCTION AND COUNTERBALANCING MEANS THEREFOR

Donald A. Campbell and Jack V. Margason, Rockford, Ill., assignors to Eclipse Fuel Engineering Co., Rockford, Ill., a corporation of Illinois Application February 21, 1957, Serial No. 641,719

1 Claim. (Cl. 137—505.18)

The present invention relates to valve constructions and more particularly to valve constructions of the pressure regulator type wherein a fluid entering the valve chamber under pressure may be delivered from the chamber at a predetermined constant pressure. Still more specifically, the invention is concerned with pressure regulator valves of the type commonly referred to as "zero governors" which are widely used to supply gas to proportional mixing equipment wherein gas and air are blended for subsequent delivery to a burner for example, and wherein it is necessary that one or both fluids, namely gas and air, be received at atmospheric pressure.

It is commonly the practice for reasons that are well known to maintain the valve stems of pressure regulating valves of the type briefly outlined above in vertical positions and thus the weight of the valve stem, the valve, the medial regions of the diaphragm, and the various parts associated with the diaphragm such as the diaphragm plates, spacer block, clamping nut and other diaphragm accessories ordinarily associated with valves of this type present normally unbalanced forces which, unless effectively balanced by mechanical means, preclude the attainment of accurate zero conditions under varying inlet pressures and varying discharge capacities. Heretofore, invariably, pressure regulators of this type have employed various types and designs of tension or compression springs which are calculated to support the weight of these otherwise unbalanced valve-operating parts. However, because of the fact that conventional tension and compression springs, whether they be of the coiled wire type or the flat leaf spring type, present a definite gradient reaction force to increasing spring displacements with the force increasing as the spring is extended or compressed, as the case may be, unbalanced increments of force are introduced and applied to the diaphragm in such a manner that the theoretically desirable positioning of the valve element under all but a limited range of valve movements for a given set of operating conditions has not been attainable in actual practice.

The present invention is designed to overcome the above-noted limitations that are attendant upon the use of conventional spring balancing means associated with pressure regulator valves of the type under consideration and, toward this end, it contemplates the use of a spring balancing means which, at least throughout the operating range required of it, will effectively and accurately neutralize the weight of the valve stem and its adjuncts, thus removing from the diaphragm the influences of spring displacement reaction forces and allowing the former to operate solely under the influence of opposed pneumatic operating forces in its intended manner. According to the present invention several types of such spring balancing means have been illustrated and described herein. In each instance, the particular spring balancing means employed is predicated upon the use of a spring element proper which will apply substantially the same force or offer substantially the same resistance to distortion throughout a wide range of movement.

By the use of such a spring balancing means for relieving the diaphragm of unwanted reaction forces, numerous advantages are attained and principal among these are an increase in capacity over conventional valve structures of corresponding size and the corollary advantage that a decrease in size is made possible, simplicity of design, and a material reduction in manufacturing cost.

Increase in capacity as outlined above is made possible inasmuch as with conventional pressure regulator valves of this sort the effective displacement of the valve proper, i.e., its movement from its seat, must necessarily be limited to a relatively short stroke lest the previously mentioned reaction force offered by the spring to wide displacements adversely affect the pneumatic balancing forces acting on the diaphragm and destroy the sensitivity of the valve structure as a whole. By the use of a spring which offers a constant resistance to flexing, compression, extension, elongation, and uncoiling of movement, the valve proper may be moved between its fully closed and its fully open positions with the otherwise unbalanced weight of the moving parts being precisely balanced in any given position of the valve. Decrease in size is attained for the same reason that an increase in capacity is made possible and, additionally, diaphragm area may be decreased to a material extent inasmuch as the practice of utilizing a diaphragm large enough to counteract the tendency of the weighted valve stem to favor inlet pressure when the spring is under light compression and to favor outlet pressure when it is under heavy compression is not necessary or desirable where constant response springs are employed. Decrease in size is also made possible according to the present invention by the elimination of extreme spring length which has heretofore been found necessary to bring the counterbalancing action of the spring within the useful range of spring displacement insofar as possible. Thus, with a shorter spring, the housing structure which encloses the same may likewise be materially reduced in size.

The provision of a pressure regulator valve of the character briefly outlined above which is extremely simple in its construction and which therefore may be manufactured at a relatively low cost; one which is rugged and durable and which therefore will withstand rough usage; one which is comprised of a minimum number of moving parts and which therefore is unlikely to get out of order; one which is capable of ease of assembly and disassembly for purposes of inspection, repair or replacement of parts; one which is extremely sensitive to pressure differentials and rapid in its response; and one which otherwise is well adapted to perform the services required of it are further desirable features which have been borne in mind in the production and development of the present invention.

Other objects and advantages of the invention, not at this time enumerated, will become more readily apparent as the nature of the invention is better understood.

In the accompanying one sheet of drawing forming a part of this specification, several embodiments of the invention have been shown.

In this drawing:

Fig. 1 is a plan view of a pressure regulator valve constructed in accordance with the principles of the present invention;

Fig. 2 is a sectional view taken substantially along the line 2—2 of Fig. 1; and Fig. 3 is a sectional view taken substantially along the line 3—3 of Fig. 2;

Referring now to the drawing in detail and in particular to Figs. 1 and 3, inclusive, wherein a preferred embodiment of the invention has been portrayed, the pressure regulator valve assembly involves in its general organization a valve body casing 10 which may be in the form of an integral hollow one-piece casting providing an internal valve chamber which is divided by a partition wall 12 into an inlet chamber 14 and an outlet chamber 16. The inlet chamber is provided with an inlet port or valve inlet 18 which is adapted to be operatively connected to the source of gaseous fuel or other gaseous medium undergoing pressure regulation while the outlet chamber is provided with an outlet port or valve outlet 20 adapted to be operatively connected to the mixing device, burner or other apparatus at which it is desired to maintain a condition of low pressure. The partition wall 12 is formed with a horizontal portion 22 having a valve opening 24 therethrough providing a valve seat 26 designed for cooperation with a valve proper 28 carried at the lower end of a valve stem 30. The valve assembly further includes a two-part diaphragm casing 32 comprised of an upper part 34 and a lower part 36, the parts being secured together by peripheral bolt assemblies 38 with a diaphragm 40 interposed therebetween. The casing 32 provides an internal diaphragm chamber 42 across which the diaphragm 40 extends in the usual manner of constructing such diaphragm assemblies. The casing part 36 is formed with a small opening 44 in the medial regions thereof in register with a vertical bore 46 formed in the top wall 48 of the valve body 10, the opening 44 and bore 46 constituting a suction passage whereby communication between the diaphragm chamber 42 and outlet chamber 16 is established. The top wall 48 is formed with a central opening 50 therein through which the valve stem 30 projects upwardly and this opening is in register with a similar opening 51 provided centrally in the lower diaphragm casing part 36. The top wall 48 of the valve body 10 underlies the lower diaphragm casing part 36 and a series of attachment screws 53 serve to maintain the valve body 10 in position on the diaphragm casing 32. A sealing diaphragm 55 has its peripheral regions clamped between the top wall 48 and casing part 36 and extends across the aligned openings 50 and 51 and has its center fixedly secured to the valve stem 30 in a manner that will be made clear presently.

As best seen in Fig. 3, the valve stem 30 is formed with a reduced upper portion 52 providing an annular shoulder 54 at its juncture with the main body of the stem. A seating ring 56 surrounds the reduced portion 52, bears against the shoulder 54 and underlies the diaphragm 55. A combined clamping ring and spacing member 58 surrounds the reduced portion 52 and is effectively interposed between the two diaphragms 40 and 55. A pair of diaphragm plates 59 are disposed on opposite sides of the diaphragm 40 and exert a clamping effect upon the medial regions of the diaphragm under the influence of a clamping nut 60 which is threadedly received on the upper end of the valve stem. The clamping nut 60 also serves to urge the clamping ring and seating ring 56 into their operative diaphragm-clamping relationship.

The arrangement of parts thus far described is more or less conventional in its design and no claim is made to any novelty per se associated with the same, the novelty of the present invention residing rather in an improved and effective means whereby the otherwise unbalanced weight of the valve stem and its associated parts may be accurately counterbalanced throughout all of the increments of motion of which the same are capable, and which means will be subsequently described and claimed.

The operation of valve structures of this type is well understood and it is deemed sufficient for purposes of description herein to state that, disregarding the action of the spring balancing means for the valve stem and its associated parts, automatic regulation of gas pressure at the outlet side of the valve assembly is attained inasmuch as if for any reason whatsoever the gas passes the partition wall 12 and builds up a pressure on the far side thereof, this pressure will be reflected through the passage 44, 46 to the interior of the diaphragm chamber 42 on the underneath side of the diaphragm 40 so that the latter will be displaced upwardly. Air entrapped in the chamber 42 above the diaphragm 40 will be bled to the atmosphere through a bleed port 62 formed in the upper diaphragm casing part 34 and the upward displacement of the diaphragm will move the valve stem 30 upwardly in such a manner as to effect closing movements of the valve 28 relative to its seat 26 until such time as the pressures existing on opposite sides of the diaphragm are equalized.

Still referring to Fig. 3, the previously mentioned valve stem counterbalancing means, in the form of the invention shown in Fig. 1, comprises a unitary spring element 70, the opposite ends of which are effectively attached by anti-friction connections to fixed points on the diaphragm casing 32 and valve stem 30 respectively in such a manner that throughout a wide range of movements the unbalanced weight of the valve stem and all of the moving parts carried thereby or which move in unison with the valve stem are substantially fully counterbalanced. Accordingly, the spring element 70 is in the form of a tightly wound wire helix 72 having a relatively large number of coil turns and the opposite end portions of which are in the form of longitudinally extending arms 74 which extend at a slight angle to the center line of the helix 72. The extreme ends of the arms 74 are looped as at 76 to provide antifriction connections for these ends of the spring.

The spring 70 has its lower end pivotally attached to the outer end of an arm 78 provided on an attachment bracket 80 suitably secured as by welding to the outer top surface of the diaphragm part 34, the connection being made by means of a stud 82 carried by the arm 78 and around which the lower spring arm loop 76 extends. The upper end of the spring is similarly pivotally attached to a pin 84 carried at the upper end of a valve stem extension 86 in the form of a generally vertically extending post, the lower end of which is turned laterally as at 88 and interposed between the clamping nut 60 and the upper diaphragm plate 59. The post 86 is formed with a laterally offset portion 90 to afford a clearance for the outer end of the fixed bracket arm 78. The spring 70, when in its valve stem supporting position just described, is slightly flexed as clearly shown in Fig. 3 so that the helix 72 is displaced laterally from the vertical center line of the post 86 with the weight of the valve stem and the associated parts which move bodily with the stem being supported from the upper end of the spring 70 and with the spring constituting the sole supporting means for the stem and such parts except for any almost negligible self-support which may be offered by the diaphragm 40 due to a degree of rigidity therein. The spring is manufactured so that when it is installed in the valve assembly in the manner just described, the otherwise unbalanced forces involved in connection with the diaphragm, valve stem and other movable parts of the assembly will be substantially neutralized with the diaphragm existing in its free unflexed state devoid of internal stresses. In other words, when the spring is assembled in the structure, it is contemplated that the diaphragm shall assume its intermediate normal unflexed condition. To compensate for manufacturing tolerances, adjusting shims such as have been shown at 92 may be inserted over the upper end of the valve stem and interposed between the laterally turned portion 88 and the upper diaphragm plate 59 or between the nut 60 and laterally turned portion 88.

The spring 72 is preferably of the type shown and described in Foster Patent No. 2,630,316, dated March 3, 1953, and entitled "Constant Compression Spring." Such a spring is manufactured and sold by the Hunter Spring Company of Lansdale, Pennsylvania, under the trade name "Flex'Ator." Springs constructed in accordance with the principles set forth in the above mentioned patent to Foster, when flexed, sustain a constant load and offer a constant resistance throughout a wide deflection. This phenomenon is made possible by forming the spring helix with a large amount of initial tension and then flexing the helix away from its axis under compression so that one side of the helix constitutes a solid column while the adjacent coil turns at the other side of the helix will become slightly separated. The action of springs of this type has been thoroughly investigated and due to the constant compression characteristics found to exist in connection with such springs, their use in the manner indicated in the present instance as a counterbalancing means for valve stem assemblies in a pressure regulator valve construction of the zero governor type leaves nothing to be desired. The importance of a high degree of resiliency or restorative force coupled with the unique ability of the spring to maintain its restorative force constant regardless of the deflection thereof throughout a wide range of such deflection, as distinguished from conventional springs which obey Hooke's Law of Resiliency, can best be illustrated by pointing out that in both the closed and fully open positions of the valve 28, as well as in all intermediate positions thereof, the upward force acting on the valve stem and its adjuncts is exactly equal to the downward gravitational force acting on these parts. Thus, the diaphragm 40 entirely free to follow any pressure differentials which may be applied to the opposite sides thereof, unrestricted by any retarding influences other than any slight negligible internal friction which may be developed within the diaphragm structure or between the points of pivotal connection at the spring ends.

The spring 70 and its associated parts above the upper diaphragm casing part 34 are enclosed in an inverted cup-shaped housing 94 which is formed with a lateral flange 96 at the rim thereof and through which flange a series of clamping screws 98 extend and are threadedly received in the casing part 34.

The invention is not to be understood as restricted to the details set forth since these may be modified within the scope of the appended claim without departing from the spirit and scope of the invention.

Having thus described the invention what we claim as new and desire to secure by Letters Patent is:

The combination with a horizontal fluid flow line, of a pressure regulating valve, said valve comprising a valve casing providing an internal valve space, a horizontal wall dividing said space and establishing inlet and outlet chambers respectively, inlet and outlet ports in said casing communicating with said inlet and outlet chambers respectively, there being a valve port in said wall establishing communication between the chambers and providing a valve seat, a valve element cooperating with said seat and movable at right angles to the wall toward and away from the seat, a diaphragm casing having a movable diaphragm therein subject on one side to the degree of pressure in said outlet chamber, a valve stem connecting said valve element and diaphragm whereby the valve element is constrained to follow the deflecting movements of the diaphragm, spring means for counterbalancing the weight of said diaphragm, valve stem and valve elements, said spring means comprising a wire spring element the medial region of which is in the form of a close wound helical spring body containing a high initial tension and from the opposite ends of which there extends a pair of spring arms, the extreme outer ends of said arms being formed with circular loops, said diaphragm casing being disposed above said valve casing, having an opening therein in alignment with the valve element, and being fixedly secured in the casing, an extension on said valve stem projecting therefrom and passing through said opening, a bracket fixedly secured at one end to said diaphragm casing exteriorly of the latter and having the other end thereof disposed between the free end of the valve extension and the diaphragm, a pin on said valve stem extension adjacent said free end thereof, a pin on said bracket in alignment with said first mentioned pin, said pins projecting through said loops respectively and serving to pivotally connect the opposite ends of the spring to said extension and bracket respectively, the weight of said diaphragm, valve stem, valve stem extension and valve element serving to maintain said spring element in a flexed condition wherein said helical spring body is displaced laterally from the common plane of said pins and wherein one side of the body presents a solid column of spring wire thicknesses where the adjacent convolutions of the helix are in contact with each other and wherein the other side of the body presents open intervening spaces between adjacent convolutions of the helix.

References Cited in the file of this patent

UNITED STATES PATENTS

| | | |
|---|---|---|
| 880,402 | Reynolds | Feb. 25, 1908 |
| 1,171,695 | Brady | Feb. 15, 1916 |
| 1,950,121 | McKee | Mar. 6, 1934 |
| 1,988,941 | Ebinger | Jan. 22, 1935 |
| 2,012,162 | Furlong | Aug. 20, 1935 |
| 2,587,375 | Paulsen | Feb. 26, 1952 |
| 2,630,316 | Foster | Mar. 3, 1953 |